United States Patent
Haghshenas et al.

(10) Patent No.: US 10,415,369 B2
(45) Date of Patent: Sep. 17, 2019

(54) BLOWOUT RATE CORRECTION METHODS AND SYSTEMS

(71) Applicant: Halliburton Energy Services, Inc., Houston, TX (US)

(72) Inventors: Arash Haghshenas, Houston, TX (US); Joe E. Hess, Richmond, TX (US); Andrew John Cuthbert, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 271 days.

(21) Appl. No.: 14/786,575

(22) PCT Filed: Dec. 18, 2014

(86) PCT No.: PCT/US2014/071116
§ 371 (c)(1),
(2) Date: Oct. 23, 2015

(87) PCT Pub. No.: WO2016/099506
PCT Pub. Date: Jun. 23, 2016

(65) Prior Publication Data
US 2016/0341028 A1   Nov. 24, 2016

(51) Int. Cl.
*E21B 47/00* (2012.01)
*E21B 47/10* (2012.01)
(Continued)

(52) U.S. Cl.
CPC .............. *E21B 47/00* (2013.01); *E21B 33/06* (2013.01); *E21B 47/06* (2013.01); *E21B 47/065* (2013.01); *E21B 47/101* (2013.01); *G01F 1/666* (2013.01)

(58) Field of Classification Search
CPC .......... E21B 33/06; E21B 47/00; E21B 47/06; E21B 47/065; E21B 47/101; G01F 1/666
See application file for complete search history.

(56) References Cited

U.S. PATENT DOCUMENTS 4,208,906 A * 6/1980 Roberts, Jr. ........... E21B 47/101
702/9
2005/0034530 A1   2/2005 Han et al.
(Continued)

FOREIGN PATENT DOCUMENTS

GB    2520479 A  *  5/2015  ............. E21B 43/12
RU    2140538 C1    10/1999
(Continued)

OTHER PUBLICATIONS

Little, Helen, et al., Utrasound Leak Detection (Dec. 1999)<https://www.researchgate.net/publication/282076755_Ultrasound_Leak_Detection>.*
(Continued)

*Primary Examiner* — Janet L Suglo
*Assistant Examiner* — Mark I Crohn
(74) *Attorney, Agent, or Firm* — Chamberlain Hrdlicka (57) ABSTRACT

A blowout rate correction system comprises a sensor and a processor in communication with the sensor. The sensor is to measure sound characteristics associated with an exit point of a borehole. The processor is to determine a blowout rate of hydrocarbons exiting the borehole based on the sound characteristics. In some embodiments, the processor activates a device when the blowout rate exceeds a selected threshold. Additional apparatus, methods, and systems are disclosed.

21 Claims, 4 Drawing Sheets

(51) Int. Cl.
    *G01F 1/66*     (2006.01)
    *E21B 33/06*     (2006.01)
    *E21B 47/06*     (2012.01)

(56) References Cited

U.S. PATENT DOCUMENTS

| | | |
|---|---|---|
| 2006/0016592 A1 | 1/2006 | Peter |
| 2009/0173150 A1 | 7/2009 | Difoggio et al. |
| 2011/0214764 A1 | 9/2011 | Fagerlund et al. |
| 2013/0119669 A1* | 5/2013 | Murphree ............... H02N 2/185 290/54 |
| 2013/0168100 A1* | 7/2013 | Judge .................... E21B 21/08 166/336 |
| 2013/0341094 A1* | 12/2013 | Taherian ................. E21B 47/14 175/40 |

FOREIGN PATENT DOCUMENTS

| | | |
|---|---|---|
| WO | WO-2009090463 A2 | 7/2009 |
| WO | WO-2016/099506 A1 | 6/2016 |

OTHER PUBLICATIONS

Oudeman, Pieter, et al., "Analysis of Surface and Wellbore Hydraulics Provides Key to Efficient B.lowout Control", *SPE Drilling & Completion*, 13(3), (Sep. 1998), 163-173.

Sheffield, Jr., J. R., et al., "Using Noise Data from Underwater Gas Vents to Estimate the Noise Level of Subsea Blowouts", *Paper OTC 2233, Offshore Technology Conference*, May 5-8, 1975, Houston, TX, (1975), 843-850.

"International Application Serial No. PCT/US2014/071116, International Search Report dated Aug. 24, 2015", 4 pgs.

"International Application Serial No. PCT/US2014/071116, Written Opinion dated Aug. 24, 2015", 5 pgs.

Sheffield, Jr. et al., SPE-5476-PA: "Using Noise Data From Underwater Gas Vents to Estimate the Noise Level of Subsea Blowouts," Journal of Petroleum Technology, Mar. 1976: pp. 259-262.

Oudeman, SPE 36485-MS: "Analysis of Surface and Wellbore Hydraulics Provides Key to Efficient Blowout Control," SPE International, 1996: pp. 711-725.

* cited by examiner

BLOWOUT RATE CORRECTION METHODS AND SYSTEMS

PRIORITY APPLICATION

This application is a U.S. National Stage Filing under 35 U.S.C. 371 from International Application No. PCT/US2014/071116, filed Dec. 18, 2014; which application is incorporated herein by reference in its entirety.

BACKGROUND

A blowout is the uncontrolled flow of hydrocarbons from a borehole, which may occur during the drilling, production, or completion phases of well construction. The blowout hydrocarbons can include oil, gas, water, or the like. When determining the cumulative discharge volume of the blowout, predicting the degree of environmental impact, and planning a dynamic kill operation, it is useful to have knowledge of the rate at which the hydrocarbons are being expelled from the wellbore.

Conventional methods for determining the blowout rate of the hydrocarbons include estimating the flow using previous experience, for example, based on the height of the flame if the released hydrocarbons are ignited, or based on estimated reservoir parameters. Other conventional methods require a choke and a gauge upstream of the flow to estimate the blowout rate. These conventional methods for estimating the blowout rate can be unreliable.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

DETAILED DESCRIPTION

FIGS. 1-4 illustrate example methods and systems for blowout rate correction based on sound characteristics associated with the point from which hydrocarbons exit the borehole (i.e., the "exit point") during a blowout. The sound characteristics, (for example, in some embodiments, a sound level) are used to determine an exit flow rate at the exit point. The flow rate is then used to estimate the blowout rate of the hydrocarbons. Further, the sound characteristics, the flow rate, or the blowout rate are corrected for one or more environmental conditions associated with the exit point. For example, the blowout rate calculations may take into account temperature, pressure, humidity, surface velocity, subsea velocity, ambient sound, and the like. In some embodiments, a device, for example an alarm, is activated when the estimated blowout rate exceeds a selected threshold. For example, in at least one embodiment, the blowout rate threshold indicates the effectiveness of a kill operation. Determining a blowout rate based on sound characteristics that is corrected for ambient environmental conditions allows for more accurate environmental assessments of the blowout and more effective planning of dynamic kill operations. For the purposes of this disclosure, hydrocarbons comprise any fluids or gasses exiting the borehole, including water, oil, steam, and the like.

Figure 1:
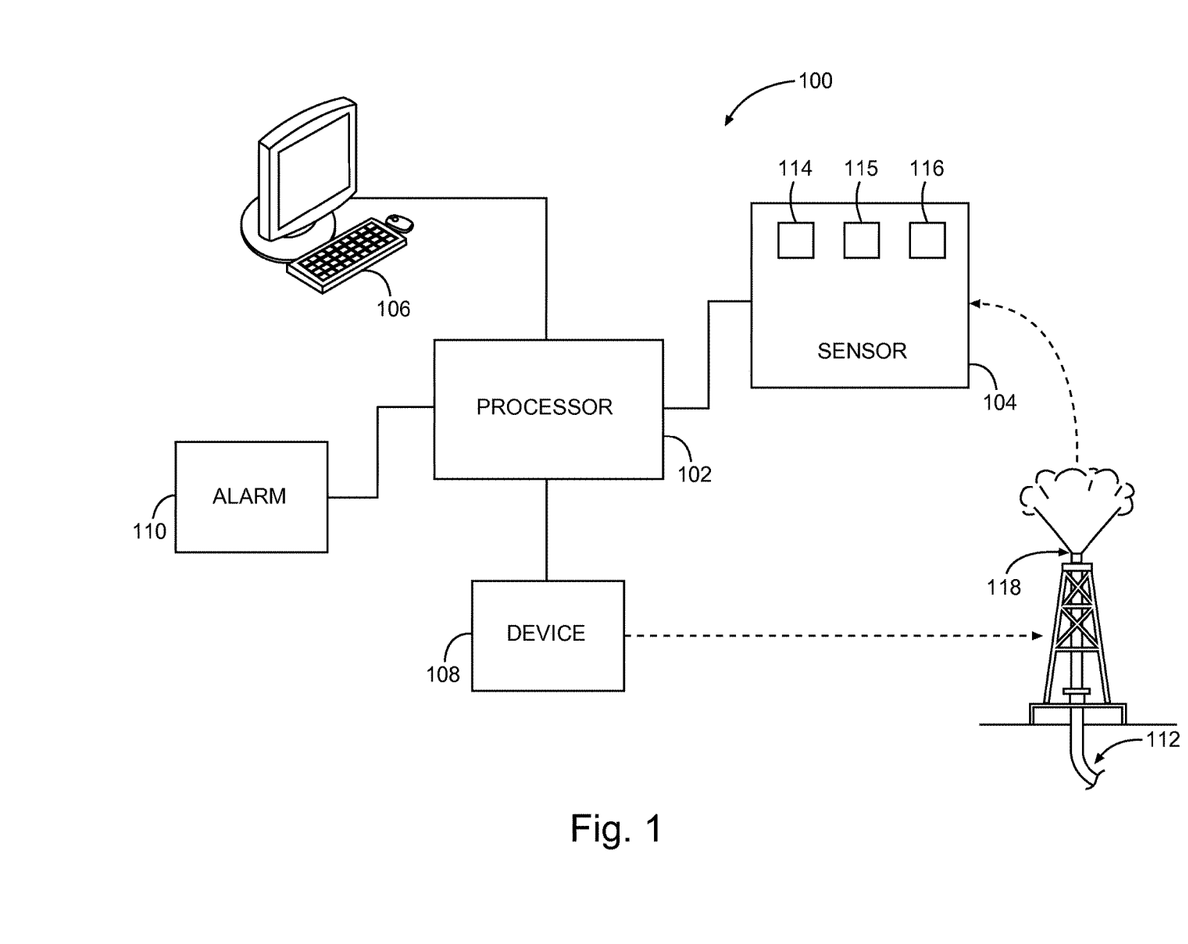
FIG. 1 depicts an example blowout rate correction system, in accordance with some embodiments.

FIG. 1 depicts an example blowout rate correction system 100, in accordance with some embodiments. The blowout rate correction system 100 generally comprises a processor 102 in communication with a sensor 104. The sensor 104 measures one or more sound characteristics associated with an exit point 118 of a borehole 112. In at least one embodiment, the sensor 104 comprises a plurality of sensors 114, 115, 116. In some embodiments, each of the plurality of sensors 114, 115, 116 measures a different sound characteristic. In some embodiments, at least two of the plurality of sensors 114, 115, 116 measure the same sound characteristic. In some embodiments, the sensor 104 measures ambient environmental data associated with the exit point 118 of the borehole 112, for example, ambient pressure, ambient temperature, ambient humidity, or the like. In at least one embodiment, the sensor 104 identifies the shape of the flow out of the exit point 118 to facilitate the processor 102 identifying the type of flow. For example, if the sensor 104 identifies that the flow out of the exit point 118 comprises a parabolic shape (indicating that the hydrocarbons expand to reach the atmospheric pressure), the processor 102 identifies that the flow comprises supersonic flow. In at least one embodiment, the shape of the flow out of the exit point 118 is determined visually and provided to the processor 102. In the illustrated embodiment, the flow out of the exit point 118 does not comprise a parabolic shape, and therefore the processor 102 would identify the flow as comprising subsonic flow. As a matter of contrast, the embodiment shown in FIG. 4 comprises a blowout with a flow having a parabolic shape, representing supersonic flow.

In at least one embodiment, the sensor 104 measures a peak frequency associated with the exit point 118 of the borehole 112 as the sound characteristic. In at least one embodiment, the peak frequency corresponds to the frequency with the greatest sound level, among several measured frequencies. In some embodiments, the processor 102 identifies the peak frequency measured by the sensor 104 and associates the peak frequency with a Strouhal number in the range of about 0.1 to about 0.4. In some embodiments, the sensor 104 measures a sound level associated with the exit point 118 of the borehole 112.

Since ambient sounds (e.g., structural vibration) can affect the measurement of sound characteristics (e.g., sound level or peak frequency) associated with a blowout, in some embodiments, the processor 102 calibrates measurements of the sensor 104 prior to the sensor 104 measuring the one or more sound characteristics. In some embodiments, the processor 102 calibrates the sensor 104 based on predefined blowout ranges. For example, in some embodiments the processor 102 uses predefined blowout ranges based on the degree of turbulence and fluid type of the hydrocarbons exiting from the exit point 118 of the borehole 112. In at least one embodiment, the processor 102 calibrates the sensor 104, to measure sound levels in the range of about 100 Hz to about 10,000 Hz.

In at least one embodiment, the processor 102 corrects the one or more sound characteristics measured by the sensor 104 to provide corrected sound characteristics. That is, the processor 102 attempts to isolate the sound created by the flow of the hydrocarbons of the blowout from ambient noises, such as ringing of the casing, structural vibrations, and the like. For example, in at least one embodiment, the processor 102 excludes frequencies below a minimum induced sound frequency. In some embodiments, the processor 102 corrects the sound measured characteristics for environmental factors, for example, wind speed, humidity, atmospheric pressure, presence of sound dampeners (e.g., debris, equipment, etc.), distance from the source, and the like. In some embodiments, the processor 102 corrects the sound characteristics based on the exit point 118 being located in a subsea environment. For example, in at least one embodiment, the processor 102 corrects the measured sound characteristics for current velocity, distance from the source, water temperature, water saturation, water density, debris around the source, sound frequencies created by other subsea sources (e.g., maritime vessels), and the like.

In some embodiments, the processor 102 determines an exit flow rate of the hydrocarbons from the exit point 118 based on the corrected sound characteristics. In at least one embodiment, the processor 102 selects an assumed flow rate, and adjusts the assumed flow rate based on a comparison of a calculated sound level with the corrected sound level. In some embodiments, the processor 102 estimates the blowout rate based on the exit flow rate. In at least one embodiment, the processor 102 determines the blowout rate of hydrocarbons exiting the exit point 118 based on the corrected sound level.

In some embodiments, the processor 102 is in communication with a display 106 to display at least some of the sound characteristics associated with the exit point 118 of the borehole 112. For example, in at least one embodiment, the display 106 displays the sound level measured by the sensor 104 or the corrected sound level corrected by the processor 102. In at least one embodiment, the display 106 displays the blowout rate. In some embodiments, the display 106 displays an indication of the blowout rate, for example, a message, a color indicator, an icon, or the like. In some embodiments, the display 106 displays an indication that the blowout rate exceeds a selected threshold. In some embodiments, the processor 102 activates an alarm 110 when the blowout rate exceeds a selected threshold. For example, in at least one embodiment, the processor 102 continues to determine the blowout rate after the start of a dynamic kill operation. If the blowout rate does not approach a predetermined threshold value, or does not decrease by at least a predetermined threshold amount, the processor 102 activates the alarm 110 to indicate that the dynamic kill operation is not as effective as desired. In at least one embodiment, the processor 102 activates a device 108 when the blowout rate exceeds a selected threshold. For example, in some embodiments, the device 108 is associated with a dynamic kill operation. In at least one embodiment, the processor 102 continues to determine the blowout rate after the start of a dynamic kill operation, and activates the device in response to a change or a lack of change in the blowout rate.

Figure 2:
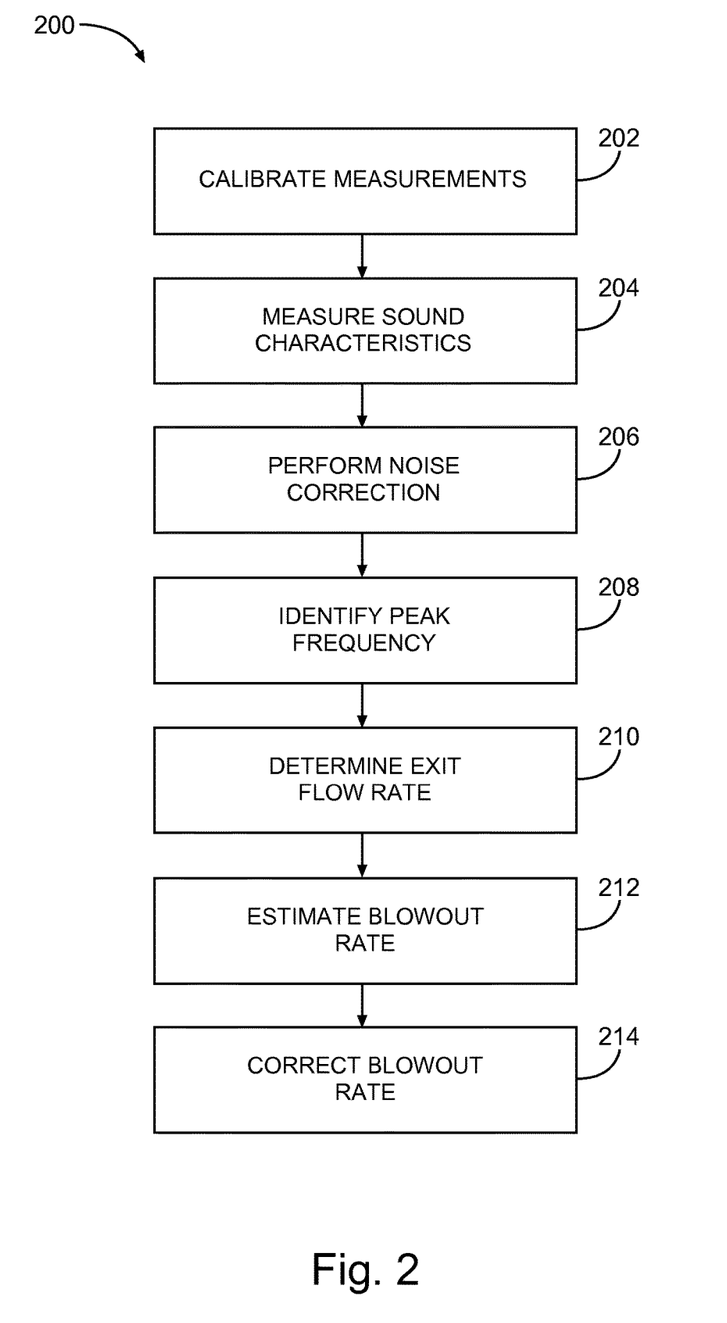
FIG. 2 is a flow diagram of an example method of blowout rate correction, in accordance with some embodiments.

FIG. 2 is a flow diagram of an example method 200 of blowout rate correction, in accordance with some embodiments. As a matter of convenience, the method 200 is described with reference to the blowout rate correction system 100 of FIG. 1. At block 202, the processor 102 calibrates the measurements by calibrating the sensor 104 based on predefined blowout ranges. Structural vibration and background sound may affect the measurements of sound characteristics. Further, sound characteristic measurement ranges may depend on the degree of turbulence and the matter type. For example, in at least one embodiment, the processor 102 calibrates the sensor 104 to measure sound characteristics comprising sound levels in the range of about 100 Hz to about 10,000 Hz for hydrocarbon blowout conditions.

At block 204 the sensor 104 measures the one or more sound characteristics associated with the exit point 118 of the borehole 112. For example, in at least one embodiment, the sensor 104 measures a frequency associated with the exit point 118 of the borehole 112. At block 206, the processor 102 performs a noise correction process on the sound characteristics to transform the sound characteristics into corrected sound characteristics. The minimum induced sound frequency created by the flow of the hydrocarbons from the exit point 118 of the borehole 112 depends on pipe characteristics, for example, geometry of the pipe, pipe wall thickness, or the like. In at least one embodiment, the processor 102 excludes frequencies below the minimum induced sound frequency. In some embodiments, the processor 102 excludes ringing frequency $f_r$ due to the ringing of the pipe or other structure associated with the borehole 112. In at least one embodiment, the processor 102 determines the ringing frequency $f_r$ based on the inner diameter D of the exit point 118, according to Equation 1:

$$f_r = \frac{500}{\pi D} \quad \text{Equation 1}$$

At block 208, the processor 102 identifies the peak frequency, such that the corrected sound characteristic comprises the peak frequency. The processor 102 associates the peak frequency with a Strouhal number in the range of about 0.1 to about 0.4 depending on the flow conditions that have been identified. For example, in at least one embodiment, the processor 102 associates the peak frequency with a Strouhal number in the range of about 0.2 to about 0.3 for jet flow. In some embodiments, the processor 102 associates the peak frequency with a Strouhal number of 0.2 when information related to the appropriate Strouhal number is not available. Other assignments are possible, as is known to those of ordinary skill in the art.

At block 210, the processor 102 determines the exit velocity of the hydrocarbons from the exit point 118 of the borehole 112 based on the corrected sound characteristics. In at least one embodiment, the processor 102 determines the exit velocity $V_{fl}$ according to Equation 2:

$$V_{fl} = \frac{f_p D}{St_P} \quad \text{Equation 2}$$

where D represents the inner diameter of the exit point 118, $f_p$ represents the peak frequency (for example, in Hertz), and $St_P$ represents the Strouhal number associated with the peak frequency (for example, 0.2).

At block 212, the processor 102 estimates the blowout rate (exit flow rate) $Q_{exit}$ (for example, in m³/second) out of the exit point 118 using the exit velocity $V_{fl}$, according to Equation 3:

$$Q_{exit} = \frac{\pi}{4} D^2 V_{fl} \quad \text{Equation 3}$$

At block 214, the processor 102 corrects the blowout rate. For example, in at least one embodiment, the processor 102 performs a flow rate correction process on the blowout rate. In some embodiments, the processor 102 corrects the blowout rate for temperature and pressure. In some embodiments the processor 102 obtains the temperature information from one or more sensors 114, 115, 116. In some embodiments, the processor 102 estimates the temperature. For example, in one embodiment the processor 102 estimates the temperature using reservoir properties and heat transfer modeling. In some embodiments, the processor 102 performs the flow rate correction process using fluid behavior correlation for a respective flow medium. In at least one embodiment, the processor 102 assumes a homogenous mixture for gas/oil/water mixtures. In at least one embodiment, the processor 102 uses volumetric averaging to determine the mixture properties. In at least one embodiment, the processor 102 uses mass balance to perform the flow rate correction process according to Equation 4:

$$Q_{fl} = \frac{Q_{exit} \rho_{exit}}{\rho_{std}} \qquad \text{Equation 4}$$

where $Q_{fl}$ represents the flow rate at standard conditions, $\rho_{exit}$ represents the density of the hydrocarbons at the exit point 118, and $\rho_{std}$ represents the density of the hydrocarbons at standard conditions.

Figure 3:
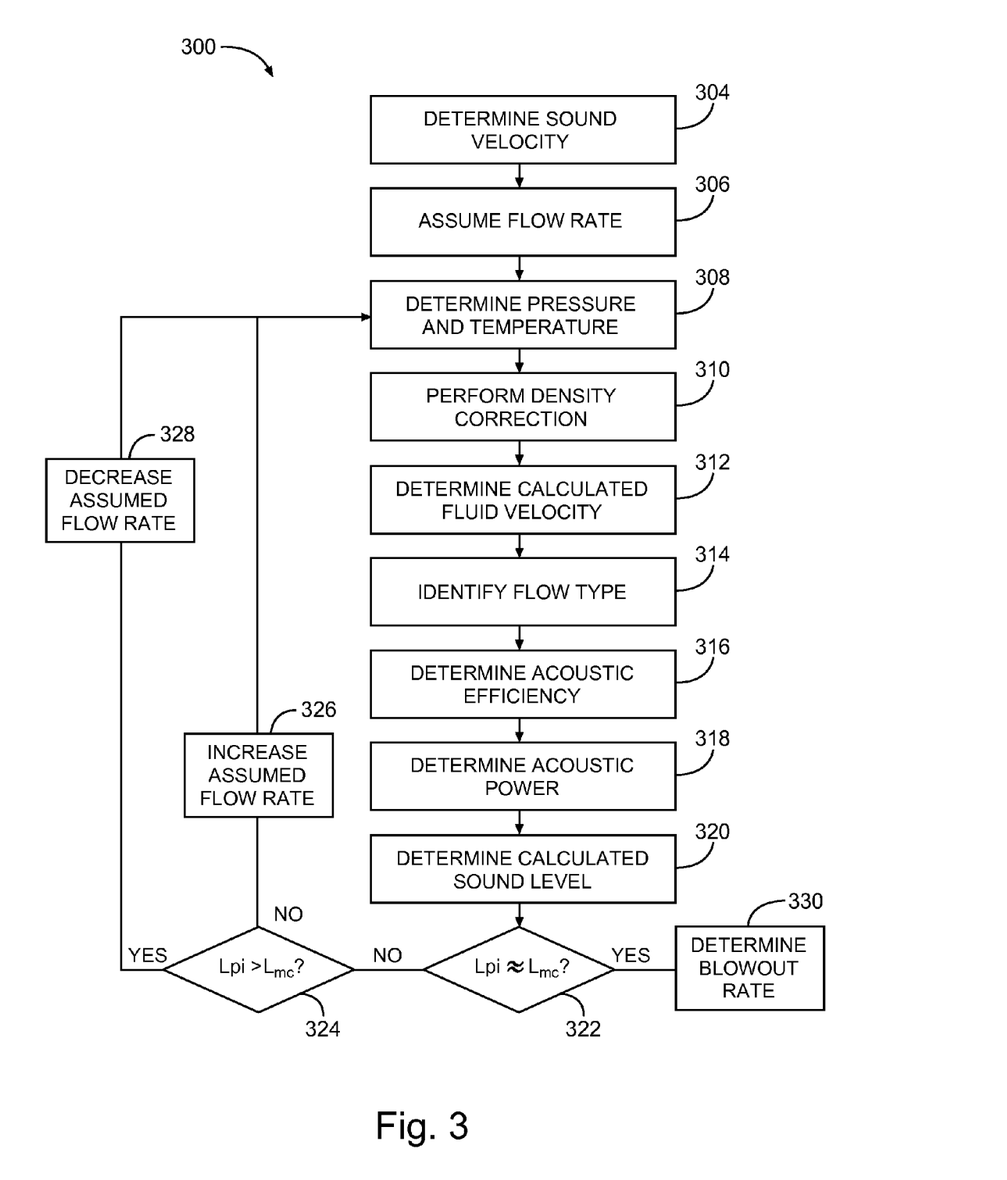
FIG. 3 is a flow diagram of another example method of blowout rate correction, in accordance with some embodiments.

FIG. 3 is a flow diagram of another example method 300 of blowout rate correction, in accordance with some embodiments. As a matter of convenience, the method 300 is described with reference to the blowout rate correction system 100 of FIG. 1.

At block 302, the blowout correction system 100 obtains data. In at least one embodiment, the blowout correction system 100 obtains ambient environmental data associated with the exit point 118, for example, ambient pressure, ambient temperature, ambient humidity, or the like. In at least one embodiment, the blowout correction system 100 measures the temperature locally to consider added heat on location due to the well being on fire. In some embodiments, the blowout correction system 100 uses one or more sensors 104, 114, 115, 116 to measure ambient environmental data. In at least one embodiment, the blowout correction system 100 uses local weather data to obtain ambient environmental data.

In some embodiments, the blowout correction system 100 obtains the density of the hydrocarbons exiting the exit point 118 of the borehole 112. In at least one embodiment, the processor 102 uses lab correlated models to determine the density of the hydrocarbons at ambient conditions, and at the exit point 118. In some embodiments, the processor 102 uses properties of analogous fluid or gas to estimate the density of the hydrocarbons. For example, in at least one embodiment, the processor 102 uses data associated with natural gas to estimate the density of the hydrocarbons. In some embodiments, the processor 102 estimates the density of the hydrocarbons using general correlations based on the Gas-Oil-Ratio (GOR) and American Petroleum Institute (API) gravity of the hydrocarbons. In some embodiments, the blowout correction system 100 obtains the flow area of the exit point 118 of the borehole 112.

In at least one embodiment, the processor 102 calculates the flow area based on the inner diameter of the exit point of the borehole 112. In at least one embodiment, the sensor 104 measures a measured sound level associated with the exit point 118 of the borehole 112. For example, in at least one embodiment, the sensor 104 comprises a sound level meter.

In at least one embodiment, the processor 102 further corrects the measured sound level for ambient noise to transform the measured sound level into a corrected sound level. For example, in at least one embodiment, the processor 102 corrects for wind speed, air humidity, atmospheric pressure, distance from the source, the presence of sound dampeners (e.g., debris or equipment around the exit point 118), water current velocity, water temperature, water saturation, water density, ambient sounds, a combination of these, or the like. In at least one embodiment, the processor 102 corrects the measured sound level according to equation 5:

$$L_{mc} = \sqrt{L_m^2 - L_b^2} \qquad \text{Equation 5}$$

wherein $L_{mc}$ represents the corrected sound level (e.g., in decibels), $L_m$ represents the measured sound level (e.g., in decibels), and $L_b$ represents the background sound level (e.g., in decibels).

At block 304, the processor 102 determines a sound velocity associated with the exit point 118. For example, in at least one embodiment, the processor 102 estimates the velocity of sound in dry air (assuming the ideal gas law is applicable, and a diatomic molecule coefficient) using equation 6:

$$V_{cda} = \sqrt{\frac{1.4\ RT}{M}} \qquad \text{Equation 6}$$

wherein $V_{cda}$ represents the velocity of sound in dry air, R represents the universal gas constant, T represents the temperature (e.g., in Kelvin), and M represents the molecular weight of air (29).

In at least one embodiment, the processor 102 corrects the velocity of sound in air for humidity. For example, in at least one embodiment, the processor 102 calculates the fraction of water in air h based on local weather measurements reported in relative percentage of the vapor pressure of water, using equation 7:

$$h = \frac{0.01\ H V_p}{P} \qquad \text{Equation 7}$$

wherein H represents the relative humidity as a percentage, $V_p$ represents the vapor pressure at atmospheric temperature, and P represents atmospheric pressure. The processor 102 can then correct the velocity of sound in the air for humidity using Equation 8-Equation 11:

$$V_{ca} = C_h V_{cda} \qquad \text{Equation 8}$$

$$C_h = 4.55 \sqrt{\frac{\gamma_w}{M_w}} \qquad \text{Equation 9}$$

$$\gamma_w = \frac{7+h}{5+h} \qquad \text{Equation 10}$$

$$M_w = 29 - 11\ h \qquad \text{Equation 11}$$

At block 306, the processor 102 assumes an assumed flow rate associated with the exit point 118. In at least one embodiment, the blowout rate correction system 100 determines, or is otherwise provided with, a flow type. For example, in at least one embodiment, the blowout rate correction system 100 determines whether the flow type is subsonic or supersonic based on the flow shape of the blowout. In at least one embodiment, the assumed flow rate is within a specified range of the flow type. In at least one embodiment, the blowout rate correction system 100 estimates the flow type, and the method 300 verifies or otherwise indicates the correct flow type.

At block 308, the processor 102 determines a pressure and a temperature associated with the exit point 118. In at least one embodiment, the processor 102 uses a known density of the fluid mixture at the standard condition in combination with the assumed flow rate to estimate the mass rate at the exit point 118. In some embodiments, the processor 102 uses one or more choke correlations to determine the pressure at the exit point 118, for example, those that are known to those of ordinary skill in the art, such as the correlations described by various authors in the literature, including Gilbert, Ros, Baxendell, Pilehvari, and the like. In at least one embodiment, the processor 102 estimates a gas flow through choke for subsonic flow using Equation 12 and for supersonic flow using Equation 13:

$$q_g = AC_d D_{choke} p_{inlet} \sqrt{\frac{k}{(k-1)\gamma_g T_{inlet}} \left[\left(\frac{p_{outlet}}{p_{inlet}}\right)^{\frac{2}{k}} - \left(\frac{p_{outlet}}{p_{inlet}}\right)^{\frac{k+1}{k}}\right]} \quad \text{Equation 12}$$

$$q_g = BC_d D_{choke} p_{inlet} \sqrt{\frac{k}{\gamma_g T_{inlet}} \left(\frac{2}{k+1}\right)^{\frac{k+1}{k-1}}} \quad \text{Equation 13}$$

wherein $C_d$ represents a choke coefficient between about 0.5 and 0.9, A and B represent unit conversion factors, $D_{choke}$ represents the equivalent diameter of the choke or flow area, k represents a gas specific heat ratio, P represents absolute pressure, T represents absolute temperature, and $\gamma_g$ represents gas specific gravity. All instances of "inlet" represent conditions at the exit point 118, and all instance of "outlet" represent ambient conditions.

In at least one embodiment, the processor 102 assumes a choke efficiency coefficient in the range of about 0.65 to about 0.75 for a blowout out of an open-ended pipe. In at least one embodiment, the processor 102 assumes a choke efficiency coefficient in the range of about 0.5 to about 0.65 for flow through a hole or an irregular shape flow area with edges.

In some embodiments, the processor 102 corrects for the cooling effect of gas using the Joule-Thompson effect at the exit point 118 based on Equation 14:

$$T_{outlet} = T_{inlet} \frac{Z_{inlet}}{Z_{outlet}} \left(\frac{p_{outlet}}{p_{inlet}}\right)^{\frac{k-1}{k}} \quad \text{Equation 14}$$

At block 310, the processor 102 performs a density correction process using pressure/volume/temperature (PVT) properties of the hydrocarbon. In at least one embodiment, the PVT properties are known or assumed for the borehole 112.

At block 312, the processor 102 determines a calculated fluid velocity. In at least one embodiment, the processor 102 derives the calculated fluid velocity from the assumed flow rate. In some embodiments, the processor 102 determines a calculated fluid density. At block 314, the processor 102 identifies a flow type of the blowout by comparing the sound velocity to the calculated fluid velocity. If the calculated fluid velocity is less than the sound velocity, the processor 102 identifies the blowout as comprising subsonic flow. If the calculated fluid velocity is greater than or equal to the sound velocity, the processor 102 identifies the blowout as comprising supersonic flow.

At block 316, the processor 102 determines an acoustic efficiency a based on the type of flow. In at least one embodiment, the processor 102 determines the acoustic efficiency as a function of exit velocity, flow regime, exit condition, and characteristics of fluid expansion. In at least one embodiment, the processor 102 determines the acoustic efficiency using Equation 15 for subsonic flow, and Equation 16 for supersonic flow:

$$\alpha = 2.21 \times 10^{-5} \left(\frac{V_{fl}}{V_c}\right)^{3.6} \quad \text{Equation 15}$$

$$\alpha = 1 \times 10^{-4} \left(\frac{V_{fl}}{V_c}\right)^{1.6} \quad \text{Equation 16}$$

At block 318, the processor 102 determines an acoustic power (sound power) W using Equation 17 for subsonic flow and Equation 18 for supersonic flow:

$$W = \alpha \frac{\dot{m} V_{fl}^2}{2} A \quad \text{Equation 17}$$

$$W = \alpha \frac{\dot{m} V_c}{2} \quad \text{Equation 18}$$

wherein $\dot{m}$ represents the fluid mass rate (e.g., kg/s).

At block 320, the processor 102 determines a calculated sound level, for example, using Equation 19:

$$L_{pi} = 10 \text{Log}\left(\frac{3.2 \times 10^9 \rho V_c W}{D^2}\right) \quad \text{Equation 19}$$

At block 322, the processor 102 determines whether the calculated sound level $L_{pi}$ is approximately equal to (e.g., within ±5%, or within ±10% of) the corrected sound level $L_{mc}$.

If, at block 322, the processor 102 determines that the calculated sound level $L_{pi}$ is not approximately equal to the corrected sound level $L_{mc}$, the method 300 proceeds to block 324, whereby the processor 102 determines whether the calculated sound level $L_{pi}$ is greater than the corrected sound level $L_{mc}$.

If, at block 324, the processor 102 determines that the calculated sound level $L_{pi}$ is not greater than the corrected sound level $L_{mc}$ (i.e., that the calculated sound level $L_{pi}$ is less than the corrected sound level $L_{mc}$) then the method 300 proceeds to block 326. At block 326, the processor 102 adjusts the assumed flow rate to an adjusted flow rate comprising a value higher than the assumed flow rate. That is, the processor 102 increases the assumed flow rate to create the adjusted flow rate before returning to block 308.

If, at block 324, the processor 102 determines that the calculated sound level $L_{pi}$ is greater than the corrected sound level $L_{mc}$, then the method 300 proceeds to block 328. At block 328, the processor 102 adjusts the assumed flow rate to an adjusted flow rate comprising a value lower than the assumed flow rate. That is, the processor 102 decreases the assumed flow rate to create the adjusted flow rate before returning to block 308.

If, at block 322, the processor 102 determines that the calculated sound level $L_{pi}$ is approximately equal to the corrected sound level $L_{mc}$, the method 300 proceeds to block 330, whereby the processor 102 determines that the blowout rate is approximately equal to the assumed flow rate.

Figure 4:
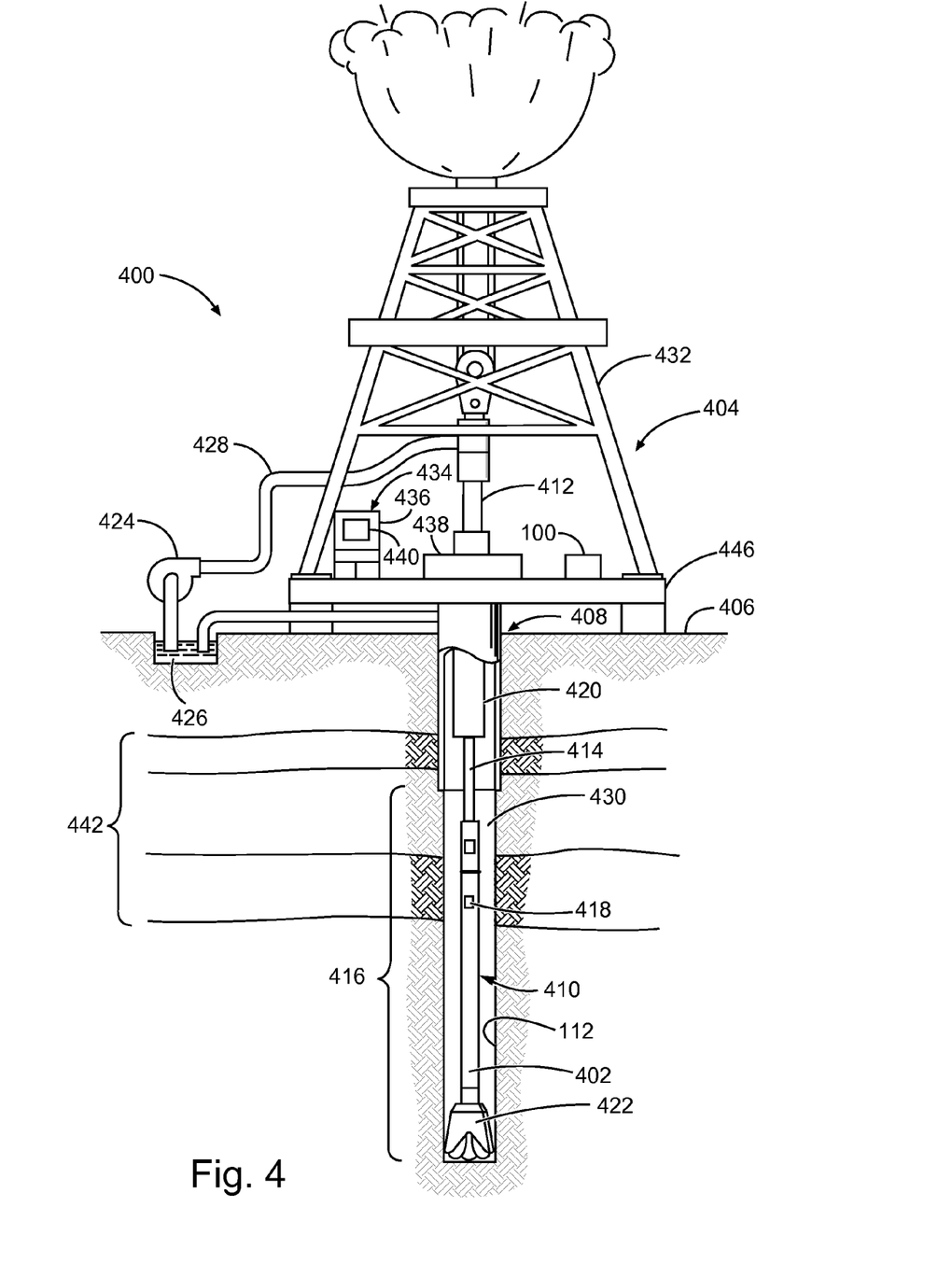
FIG. 4 depicts an example system at a drilling site, in accordance with some embodiments.

FIG. 4 depicts an example system 400 at a drilling site comprising a blowout, in accordance with some embodiments. In the illustrated embodiment, the system 400 may form a portion of a drilling rig 404 located at the surface 406 of a well 408 at a drilling platform 446 equipped with a derrick 432. The drilling rig 404 may provide support for a drillstring 410. The drillstring 410 may operate to penetrate a rotary table 438 for drilling the borehole 112 through subsurface formations 442. The drillstring 410 may include a Kelly 412, drill pipe 414, and a bottom hole assembly 416, perhaps located at the lower portion of the drill pipe 414.

The bottom hole assembly 416 may include drill collars 420, a down hole tool 402, and a drill bit 422. The drill bit 422 may operate to create the borehole 112 by penetrating the surface 406 and the subsurface formations 442. The down hole tool 402 may comprise any of a number of different types of tools including MWD tools, LWD tools, and others.

During drilling operations, the drillstring 410 (perhaps including the Kelly 412, the drill pipe 414, and the bottom hole assembly 416) may be rotated by the rotary table 438. Although not shown, in addition to, or alternatively, the bottom hole assembly 416 may also be rotated by a motor (e.g., a mud motor) that is located down hole. The drill collars 420 may be used to add weight to the drill bit 422. The drill collars 420 may also operate to stiffen the bottom hole assembly 416, allowing the bottom hole assembly 416 to transfer the added weight to the drill bit 422, and in turn, to assist the drill bit 422 in penetrating the surface 406 and subsurface formations 442.

During drilling operations, a mud pump 424 may pump drilling fluid (sometimes known by those of ordinary skill in the art as "drilling mud") from a mud pit 426 through a hose 428 into the drill pipe 414 and down to the drill bit 422. The drilling fluid can flow out from the drill bit 422 and be returned to the surface 406 through an annular area 430 between the drill pipe 414 and the sides of the borehole 112. The drilling fluid may then be returned to the mud pit 426, where such fluid is filtered. In some embodiments, the drilling fluid can be used to cool the drill bit 422, as well as to provide lubrication for the drill bit 422 during drilling operations. Additionally, the drilling fluid may be used to remove subsurface formation cuttings created by operating the drill bit 422.

Some embodiments include a surface logging facility 434 for processing, analysis, and/or storage of measurement or other data. The processing and analysis may include natural gamma-ray spectroscopy measurements and/or determination of formation density. The logging facility 434 may be provided with electronic equipment for various types of signal processing A workstation 436 and the controller 440 may include modules comprising hardware circuitry, a processor, and/or memory circuits that may store software program modules and objects, and/or firmware, and combinations thereof, as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

In the illustrated embodiment, the blowout rate correction system 100 of FIG. 1 is located on the drilling platform 446. However, in other embodiments, the blowout rate correction system 100 is located in any of a variety of locations. In at least one embodiment, at least some components of the blowout rate correction system 100 are located proximate to the exit point 118. The blowout rate correction system 100 may be used in all stages of drilling, production, or completion phases of well construction, for both on-land and sub-sea configurations. Further, while one or more of the illustrated embodiments depict a drilling rig, in some embodiments, the blowout rate correction system 100 is used when a drilling rig is not present on location.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a sensor located external to a borehole and proximate to an exit point of the borehole, wherein the sensor is configured to measure sound characteristics associated with an external flow of hydrocarbons out of an exit point of the borehole;

a processor in communication with the sensor, wherein the processor is programmed to determine a blowout rate of the external flow of hydrocarbons exiting the borehole based on a peak frequency of the sound characteristics; and an alarm to be activated by the processor when the blowout rate exceeds a selected threshold.

2. The system of claim 1, further comprising:

a display to display at least some of the sound characteristics and the blowout rate; and a device to be activated by the processor when the blowout rate exceeds a selected threshold.

3. A method, comprising:

positioning a sensor external to a borehole and proximate to an exit point of the borehole;

measuring, with the sensor, sound characteristics associated with a flow external to the exit point of the borehole;

performing, with a processor, a noise correction process on the sound characteristics to transform the sound characteristics into corrected sound characteristics by excluding frequencies below a minimum induced sound frequency, wherein the noise correction is based at least in part on the flow external to the exit point; and determining, with the processor, a blowout rate of hydrocarbons from the borehole based on a peak frequency of the corrected sound characteristics.

4. The method of claim 3, further comprising activating an alarm when the blowout rate exceeds a selected threshold.

5. The method of claim 3, further comprising identifying the peak frequency and associating the peak frequency with a Strouhal number in the range of about 0.1 to about 0.4.

6. The method of claim 3, further comprising calibrating measurements prior to the measuring, based on predefined blowout rate ranges.

7. The method of claim 3, further comprising determining an exit velocity of the hydrocarbons from the exit point based on the corrected sound characteristics, wherein the blowout rate is estimated based on the exit velocity.

8. The method of claim 3, further comprising performing a flow rate correction process on the blowout rate using mass balance.

9. The method of claim 3, further comprising correcting the blowout rate for one or more environmental conditions associated with the exit point.

10. The method of claim 9, wherein the one or more environmental conditions comprises at least one of: temperature, pressure, humidity, surface velocity, subsea velocity, or ambient sound.

11. A method, comprising:

measuring, with a sensor external to a borehole and proximate to an exit point of the borehole, a measured sound level associated with a flow external to the exit point of the borehole;

correcting the measured sound level for ambient noise to transform the measured sound level into a corrected sound level;

determining a blowout rate of hydrocarbons exiting at the exit point based on a peak frequency of the corrected sound level; and activating an alarm when the blowout rate exceeds a selected threshold.

12. The method of claim 11, further comprising:

assuming an assumed flow rate;

determining a calculated sound level based on the assumed flow rate; and comparing the calculated sound level with the corrected sound level to determine the blowout rate.

13. The method of claim 12, further comprising:

identifying the calculated sound level as comprising a value that is approximately equal to a value of the corrected sound level; and determining that the assumed flow rate comprises a value that is approximately equal to a value of the blowout rate.

14. The method of claim 12, further comprising:

identifying the calculated sound level as comprising a value that is less than a value of the corrected sound level; and adjusting the assumed flow rate to an adjusted flow rate comprising a value higher than a value of the assumed flow rate.

15. The method of claim 12, further comprising:

identifying the calculated sound level as comprising a value that is greater than a value of the corrected sound level; and adjusting the assumed flow rate to an adjusted flow rate comprising a value lower than a value of the assumed flow rate.

16. The method of claim 15, further comprising determining an adjusted sound level based on the adjusted flow rate.

17. The method of claim 15, wherein the ambient environmental data comprises at least one of: ambient pressure, ambient temperature, or ambient humidity.

18. The method of claim 15, further comprising:

selecting an assumed flow rate;

determining a calculated fluid velocity based on the assumed flow rate;

comparing the calculated fluid velocity to the sound velocity; and identifying a flow type associated with the assumed flow rate based on the comparing.

19. The method of claim 11, further comprising:

obtaining ambient environmental data associated with the exit point; and determining a sound velocity associated with the exit point based on the ambient environmental data.

20. The method of claim 19, further comprising identifying subsonic flow associated with the assumed flow rate based on the calculated fluid velocity comprising a value that is less than a value of the sound velocity.

21. The method of claim 19, further comprising:

identifying supersonic flow associated with the assumed flow rate based on the calculated fluid velocity comprising a value that is equal to or greater than a value of the sound velocity.

* * * * *